Patented Aug. 3, 1937

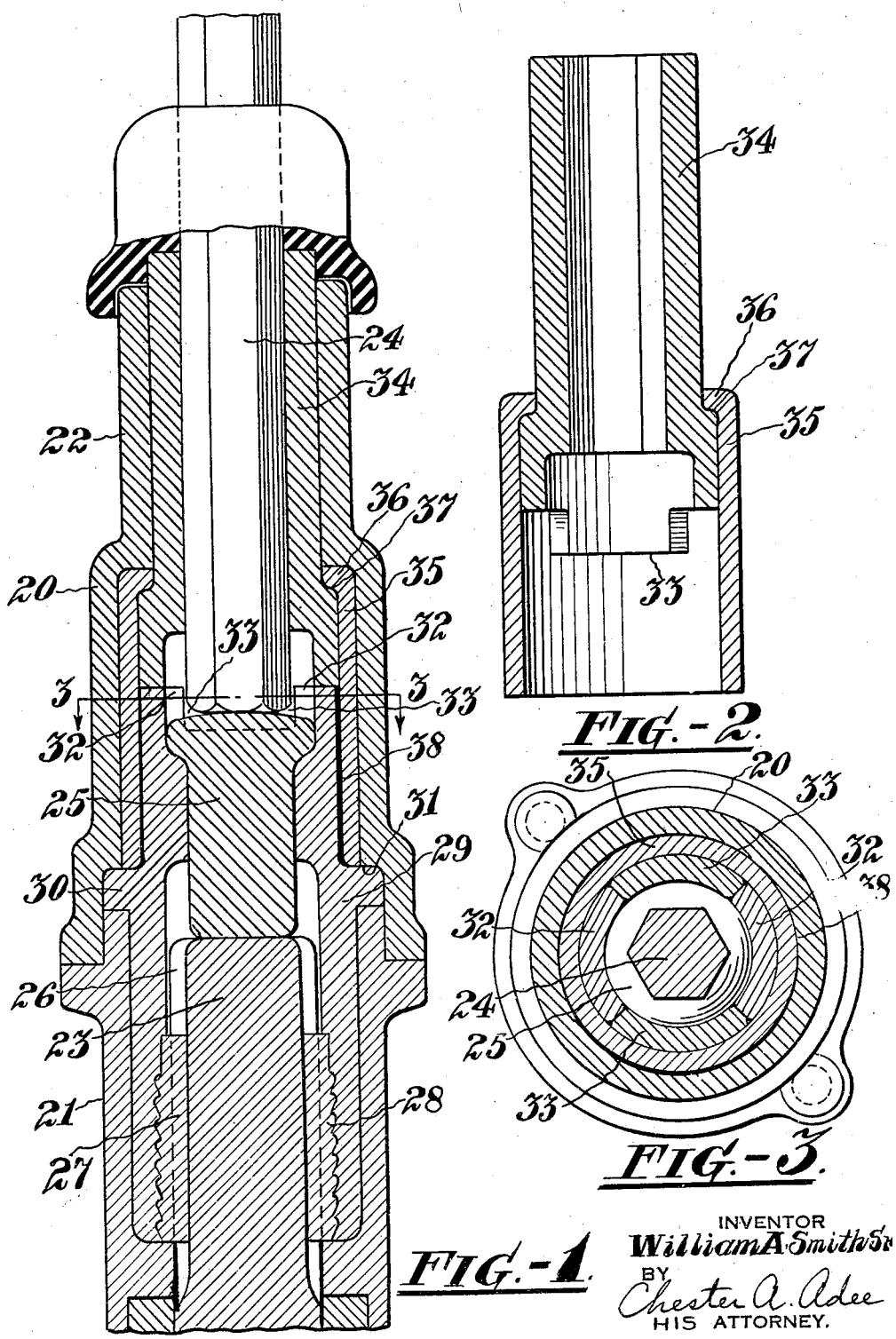

2,088,670

UNITED STATES PATENT OFFICE 2,088,670

ROCK DRILL

William A. Smith, Sr., Athens, Pa., assignor to Ingersoll-Rand Company, Jersey City, N. J., a corporation of New Jersey Application August 15, 1936, Serial No. 96,156

3 Claims. (Cl. 121—7)

This invention relates to rock drills, and more particularly to a chuck mechanism for fluid actuated rock drills of the type embodying rotation mechanism for effecting a rotary movement of the working implement between blows of the percussive element.

One object of the invention is to protect the comparatively costly casing parts against damage incident to relative misalignment of the parts constituting the chuck mechanism.

Another object is to assure correct relative positions of the working implement and the percussive element whereby it is actuated.

Other objects will be in part obvious and in part pointed out hereinafter.

In the drawing accompanying the specification and in which similar reference numerals refer to similar parts, Figure 1 is a sectional elevation of so much of a pneumatic tool as will serve to illustrate the invention and a practical application thereof, Figure 2 is a similar view of a chuck part, and Figure 3 is a transverse view through Figure 1 on the line 3—3.

Referring more particularly to the drawing, the rock drill 20 is shown as being of the stoper type commonly used for drilling up-holes or holes above the horizontal. It comprises a cylinder 21 and a front head 22 which constitute the casing parts and may be secured together in any suitable manner.

Only the front end of the cylinder 21 is shown, and the cylinder contains a piston having a stem 23 for delivering blows to a working implement 24 extending into the front head. An anvil block 25 is interposed between the piston and the working implement for transmitting the blows of the piston to the working implement.

The rock drill is shown as being of the type embodying rotation mechanism and while such mechanism is not shown its function is to effect rotary movement of the working implement between blows of the piston 23. The piston constitutes an element of the rotation mechanism and the stem 23 is accordingly provided with flutes 26 to interlock slidably with ribs 27 in a chuck nut 28 threaded into a chuck 29 in the cylinder 21 and the front head 22. The chuck 29 also guides the anvil block 25 and, in the present instance, has an external flange 30 which seats with one end against the front end of the cylinder 21 and with its opposite end against a shoulder 31 in the front head.

On the front end of the chuck 29 are clutch members 32 which interlock with similar clutch members 33 on the adjacent end of a chuck sleeve 34 in the front head and serving as a guide for the working implement 24, the latter being slidably interlocked with the chuck sleeve. The clutch members, of which two each are formed on the chuck and chuck sleeve in the structure shown, are in the form of segmental lugs on the ends of these elements.

The parts so far described are of conventional types, and in prior structures embodying them it has been customary to employ the inner surface of major casing parts as bearing surfaces for the chuck mechanism. When the parts are new little or no difficulty may be experienced in maintaining them in relative axial alignment. However, as wear on all of the surfaces of the rotating and associated parts takes place the chuck parts may move out of relative alignment and the pressure applied for pressing the working implement to the work causes the chuck sleeve 34 to tilt in the front head. The outer edges of the clutch members will then bear heavily against the wall of the casing housing them and, being rotatable in the casing, have the effect of abrading or scooping out the adjacent wall, thereby necessitating replacement of the casing, often after a comparatively brief period of usage and usually at a considerable expense.

The present invention contemplates obviating this destructive action of the chuck mechanism. In the form of the invention illustrated the sleeve 34 is provided with a cylindrical extension, preferably in the form of a separate sleeve 35, encircling the portion of the chuck sleeve carrying the clutch members 33 and encircling the portion of the chuck carrying the clutch members 32.

The sleeve 35 may be affixed to the chuck sleeve 34 in any suitable manner, for example by press-fit. It preferably abuts the flange 30 with one end and carries an introverted flange 36 at its other end to seat against a shoulder 37 on the sleeve 34. The portion of the chuck lying within the sleeve 35 should be of sufficiently smaller diameter than the interior of the sleeve to enable the chuck to be readily entered into the sleeve. This clearance or space designated by 38 is exaggerated and need only be of an extent to assure a nice sliding fit between the sleeve 35 and the chuck 29.

Being affixed to the sleeve 34, the sleeve 35 will rotate therewith and, inasmuch as there is no relative rotative movement between the sleeve 35 and the chuck 29, no material damage may be caused to the inner surface of the sleeve 35 as a result of an incorrect angular position of the sleeve 34 and the front head will be adequately protected against undue localized wearing action by portions of the chuck mechanism.

A further highly desirable advantage of the present invention is that the sleeve 35 retains the chuck and chuck sleeve, hence the piston and the working implement, in coaxial alignment, and the full force of the blows of the piston may, therefore, be effectively applied to the working implement for driving it into the work.

I claim:

1. Chuck mechanism for rock drills, comprising a casing, a plurality of sleeves in the casing, clutch members on the sleeves interlockingly engaging each other, and means on one sleeve extending into the transverse plane of the clutch members to prevent contact of the clutch members with the casing.

2. Chuck mechanism for rock drills, comprising a casing, a plurality of sleeves in the casing, clutch members on the sleeves interlockingly engaging each other, and a hollow extension on one sleeve encircling the other sleeve to prevent contact of the clutch members with the casing.

3. Chuck mechanism for rock drills, comprising a casing, a sleeve in the casing, a chuck, clutch members on the ends of the sleeve and the chuck interlockingly engaging each other, and a hollow extension carried by the sleeve and encircling the chuck to prevent contact of the clutch members with the casing.

WILLIAM A. SMITH, Sr.